United States Patent [19]

Tanaka et al.

[11] 4,065,156
[45] Dec. 27, 1977

[54] SEAT BELT SYSTEM

[75] Inventors: Yutaka Tanaka, Aichi; Yutaka Kondo, Toyota; Akira Yamanaka, Okazaki, all of Japan

[73] Assignee: Toyota Jidosha Kogyo Kabushiki Kaisha, Toyota, Japan

[21] Appl. No.: 675,782

[22] Filed: Apr. 12, 1976

[51] Int. Cl.² ............................................. B60R 21/02
[52] U.S. Cl. ................................. 280/747; 297/388; 297/389
[58] Field of Search ............... 280/747, 744; 297/388, 297/389; 180/82 C

[56] References Cited
U.S. PATENT DOCUMENTS

| | | | |
|---|---|---|---|
| 3,549,203 | 12/1970 | Rawson | 280/744 |
| 3,941,419 | 3/1976 | Blom | 297/388 X |
| 3,973,786 | 8/1976 | Rogers, Jr. | 280/747 |

FOREIGN PATENT DOCUMENTS

| | | | |
|---|---|---|---|
| 745,012 | 10/1966 | Canada | 297/389 |
| 1,456,116 | 5/1969 | Germany | 297/389 |
| 1,172,144 | 11/1969 | United Kingdom | 280/747 |

Primary Examiner—Joseph F. Peters, Jr.
Assistant Examiner—Michael J. Forman
Attorney, Agent, or Firm—Stevens, Davis, Miller & Mosher

[57] ABSTRACT

A first slip joint and a second slip joint are respectively arranged on a member mounted within an upper part of a car and a member mounted within a lower part of a car, a retractor is mounted on a side wall inside the car body (upon, for example, a center pillar) between the first and second slip joints, and a shoulder belt and a lap belt are respectively conducted from the retractor to a tongue plate through the first slip joint and through the second slip joint. A load which is exerted on a mounting portion of the retractor when the car body is suddenly decelerated can be confined to below approximately 50 Kg.

1 Claim, 7 Drawing Figures

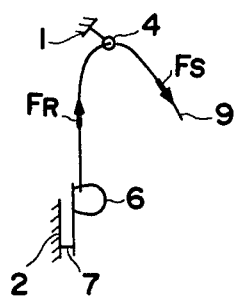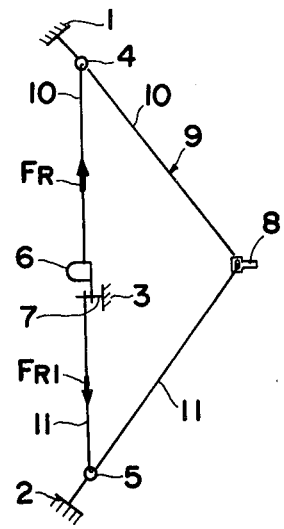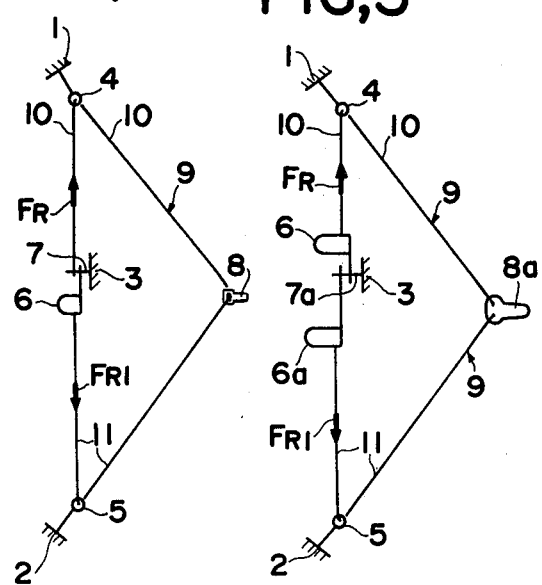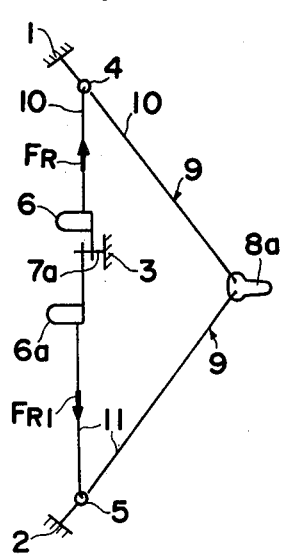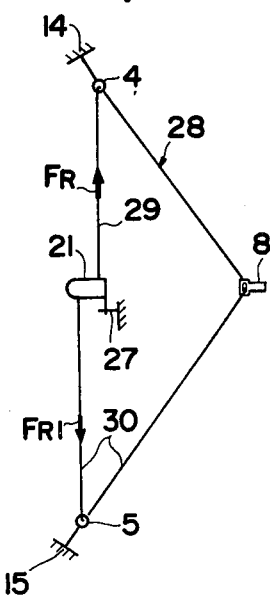

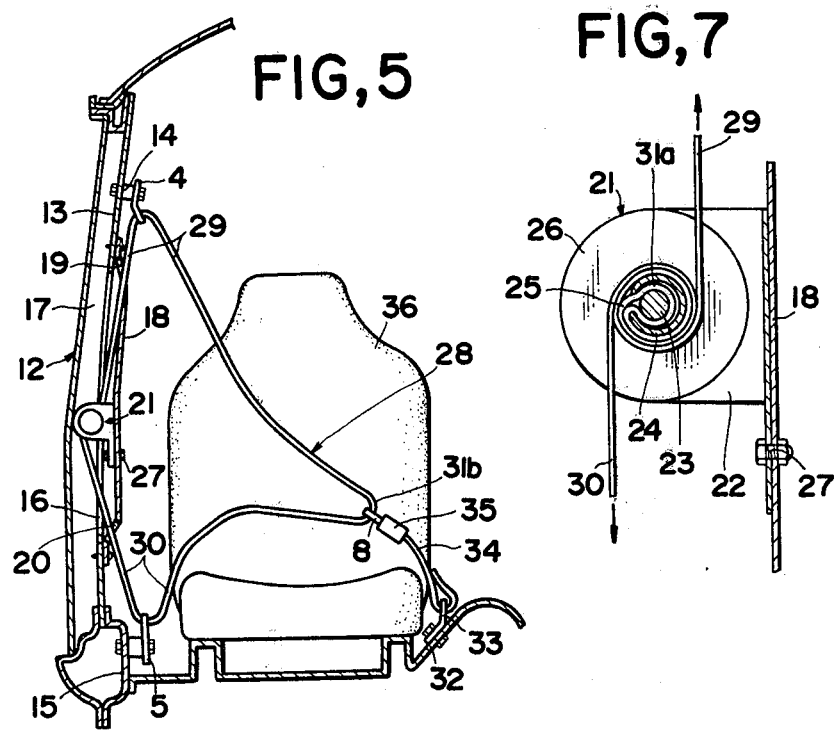
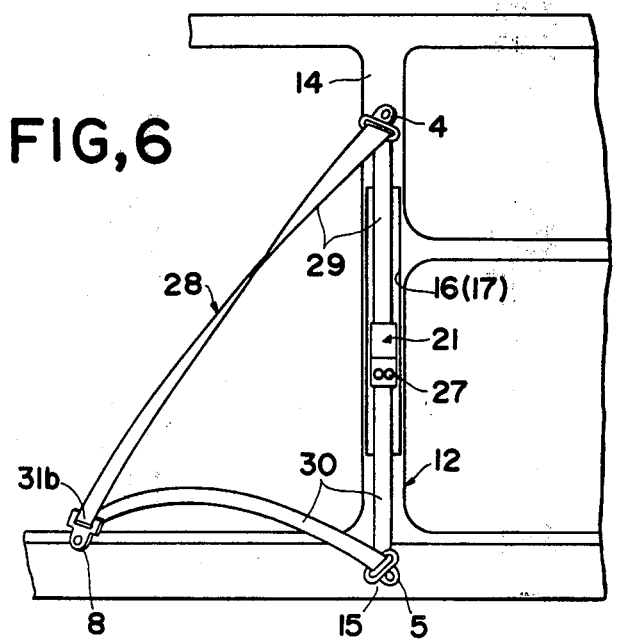

SEAT BELT SYSTEM

FIELD OF THE INVENTION

This invention relates to a seat belt system which makes improvements in the conduction of a belt in a three-point type seat belt assembly.

BACKGROUND OF THE INVENTION

The three-point type seat belt assembly having hitherto been generally used adopts the so-called well-rope type conduction of a belt 9 as shown in FIG. 8. Mounting means for the seat belt requires considerable strength in view of safety, and substantially equal standards are stipulated in Japan, U.S.A., Europe, Australia, etc.

The following table indicates examples of the results of tests based on the European standard (ECE) and the Australian standard (ADR):

| | ECE No. 14 Test of 3 Points | | | |
|---|---|---|---|---|
| Sorts of Loads Cars | Fs (Kg) | $F_R$ (Kg) | Load factor (%) | $F_R$/Fs |
| A | 890 | 515 | 106 | 0.58 |
| B | 860 | 550 | 106 | 0.64 |
| C | 790 | 420 | 106 | 0.53 |

| | ADR 5B Test of Shoulder | | | |
|---|---|---|---|---|
| Sorts of Loads Cars | Fs (Kg) | $F_R$ (Kg) | Load factor (%) | $F_R$/Fs |
| A | 970 | 660 | 100 | 0.68 |
| B | 1205 | 920 | 124 | 0.76 |
| C | 1030 | 640 | 103 | 0.62 |

(Regarding the sorts of loads, refer to FIG. 8)

As understood from the table, a load of 420 Kg – 920 Kg is exerted on a mounting portion 7 for the retractor 6 in the case of the well-rope type conduction of the belt 9.

In view of the structure of the car body, the proper position which can endure such great load and at which the retractor 6 can be mounted lies in no other place than a rocker panel or a center pillar.

Accordingly, the mounting position of the retractor 6 has heretofore been restricted to the rocker panel or the center pillar. As a result, in the case of a 2-door car, the belt attaching and detaching operational property for the occupant of a rear seat is inferior.

OBJECT OF THE INVENTION

This invention has for its objects to reduce the load which is exerted on a mounting portion for a retractor, to diminish the restrictions for the mounting position of the retractor so as to thereby mount the retractor at a position where it can be easily housed inside a quarter or a center pillar, and to enhance the belt attaching and detaching operational property for a rear seat occupant.

BRIEF DESCRIPTION OF THE DRAWINGS

These and other objects of the invention will be seen by reference to the following description taken in connection with the accompanying drawings, in which:

FIGS. 1 to 4 are skeleton diagrams for elucidating first to fourth embodiments of the seat belt system according to this invention, respectively;

FIG. 5 is a front view showing the concrete aspect of performance of the fourth embodiment, FIG. 6 is a side view of the embodiment in FIG. 5 under the state under which a seat is removed, FIG. 7 is an enlarged vertical sectional elevation of a retractor portion of the embodiment in FIG. 5, and FIG. 8 is a schematic view for elucidating a prior-art seat belt system.

DETAILED DESCRIPTION OF THE ILLUSTRATED EMBODIMENTS

FIG. 1 shows the first embodiment of this invention. A first slip joint 4 is secured to a member 1 at an upper part of a car, such as a roof side rail. A second slip joint 5 is secured to a member 2 at a lower part of a car, such as a rocker panel. A retractor 6 is mounted on a side wall 3 inside a car body. The retractor 6 is arranged between the first and second slip joints 4 and 5 in the vertical direction, and in this embodiment, it is secured with locking means, such as a bolt and nut, by disposing fittings 7 on the side of the second slip joint 5.

A single belt 9 is led out from the retractor 6. The belt 9 is conducted in such manner that it is pulled upwards, that it is suspended and passed through the first slip joint 4, a through tongue 8, which is a tongue plate, and then through the second slip joint 5 such that an end part of the belt is secured to the fittings 7 of the retractor 6.

The part of the belt 9 which is pulled out upwards from the retractor 6, suspended and passed through the first slip joint 4 and led towards the through tongue 8 is used as a shoulder belt 10. On the other hand, that part of the belt 9 which is pulled downwards from the fittings 7 of the retractor 6, suspended and passed through the second slip joint 5 and led towards the through tongue 8 is used as a lap belt 11.

The retractor 6 is so operated that when the car body is suddenly decelerated, pawls (not shown) mesh with ratchet wheels (not shown) under the action of a Vehicle Inertia Sensitive type emergency engagement device (not shown). Owing to the mesh between the pawls and the ratchet wheels, a take-up shaft (not shown) for the belt 9 is locked so as to be prevented from rotating in the direction of protraction of the belt 9. The illustration of a concrete construction of the mechanism is ommited.

With the seat belt system of the foregoing construction, when an occupant tends to rapidly move forwardly due to, for example, the collision of the vehicle, the Vehicle Inertia Sensitive type emergency engagement device functions, the pawls mesh with the ratchet wheels, the rotation of the take-up shaft of the belt 9 is locked and the belt 9 is subjected to a tensile load, and loads $F_R$ and $F_{R1}$ in directions opposite to each other are respectively exerted on the shoulder belt 10 and the lap belt 11 as indicated by arrows in the figure.

As a result, only a load F which is the difference between the load $F_R$ applied to the shoulder belt 10 and the load $F_{R1}$ applied to the lap belt 11 acts on the fittings 7 of the retractor 6. It has been experimentally confirmed that the load F can be confined within approximately 50 Kg.

Therefore, the restriction in strength of the fittings 7 of the retractor 6 is diminished. It is possible to mount the retractor 6 on any desired place of the side wall 3 in the interior of the car body and to house it in a quarter.

A load which is exerted on the mounting portion of the second slip joint 5 becomes greater than in the case of fixing a belt anchor to this portion. As a result of experiments, however, it has been confirmed that the extent of such an increase in the load can be satisfactorily withstood.

FIG. 2 shows the second embodiment of this invention. The belt 9 is conducted in such a manner that the retractor 6 is mounted by disposing the fittings 7 on the side of the first slip joint 4, the belt 9 is then led out from the retractor 6 and suspended and passed through the second slip joint 5, the through tongue 8, which is a tongue plate, and then through the first slip joint 4, whereby the end part of the belt is secured to the fittings 7 of the retractor 6. The other points of the construction are the same as in the first embodiment. The function is also the same as in the first embodiment.

FIG. 3 shows the third embodiment of this invention. First and second retractors 6 and 6a are arrayed in series between the first and second slip joints 4 and 5. Besides, both the retractors 6 and 6a are mounted on a common fitting 7a. The shoulder belt 10 led out from the first retractor 6 is pulled upwards, and is suspended and passed through the first slip joint 4. The lap belt 11 led out from the second retractor 6a is pulled downwards, and is suspended and passed through the second slip joint 5. End parts of the belts 10 and 11 are respectively fixed to a tongue plate 8a.

Also with the seat belt system of the third embodiment, when the tensile load acts on the belt 9, only the load F which is the difference between the load $F_R$ applied to the shoulder belt 10 and the load $F_{R1}$ applied to the lap belt 11 is exerted on the common fitting 7a of the first and second retractors 6 and 6a.

FIGS. 4 to 7 show the fourth embodiment of this invention. In this embodiment, the first slip joint 4 is secured to an upper part 14 of an interior side wall 13 of a center pillar 12 inside the car body, while the second slip joint 5 is secured to a rocker panel 15 being a lower part member inside the car body.

The side wall 13 of the center pillar 12 on the room interior side is formed with a window 16. A cover 18 is attached to the side wall 13 so as to cover the window 16. A port 19 for the shoulder belt 29 is formed within an upper part of the cover 18, while another port 20 for a lap belt 30 is formed within a lower part thereof.

A fitting part 27, is arranged on the cover 18 on the interior side wall 13 of the center pillar 12. A retractor 21 is so mounted that it can be housed in a vacant space 17 inside the center pillar 12.

As illustrated on an enlarged scale in FIG. 7, the retractor 21 comprises a retractor body 22, a rotary shaft 23 which is rotatably carried on the retractor body 22, and a take-up shaft 24 which is formed of a hollow body and which is capable of defning a spacing from the outer peripheral surface of the rotary shaft 23. Shaft 24 has, formed within a part of its peripheral surface, an opening 25 for drawing out the belt, and is disposed around the rotary shaft 23 in a manner so as to be concentric therewith. The shaft is also attached to the retractor body 22 in such a manner as to rotate integrally with the rotary shaft 23, and the same also serves as a means to snugly fit one connection part 31a of the endless belt 28 onto the rotary shaft 23 as a noose-shaped folded-back portion and to take up the shoulder belt 29 and the lap belt 30 one over the other on the take-up shaft 24. The shoulder and lap belts 29 and 30 can be simultaneously taken up or drawn out by equal lengths in directions opposite to each other from diametrically opposed parts of the rotary shaft 23.

Likewise to the first embodiment, the retractor 21 is so operated that when the car body is suddenly decelerated, a Vehicle Inertia Sensitive type emergency engagement device (not shown) functions to bring a pawl (not shown) into mesh with a ratchet wheel 26 and to lock the rotary shaft 23 and the take-up shaft 24 so as to prevent them from rotating in the direction of protraction of the belt 28.

The shoulder belt 29 led out from the retractor 21 is passed through the upper belt port 19 formed in the cover 18, is pulled upwards, is suspended and passed through the first slip joint 4, and is led towards the through tongue 8 of the tongue plate in front of a seat 36. On the other hand, the lap belt 30 led out from the retractor 21 is inserted through the lower belt port 20 formed in the cover 18, is pulled downwards, is suspended and passed through the second slip joint 5, and is led towards the through tongue 8. The other connection part 31b of both the shoulder and lap belts 29 and 30 is inserted through the through tongue 8 and is folded back.

The through tongue 8 is engageable with a buckle 35. The buckle 35 is joined to a coupling piece 34 which is attached to the fixture 33 secured to a floor 32.

The fourth embodiment of the above construction is the same as the first embodiment in that when the tensile load acts on the belt 28, the loads in the mutually opposite directions are exerted on the shoulder belt 29 and the lap belt 30, with the result that the load F which is the difference between the load $F_R$ on the shoulder belt 29 and the load $F_{R1}$ on the lap belt 30 acts on the fittings 27 of the retractor 21.

This invention has the construction and function as described above in detail. The fitting portion for the retractor is subjected to only the load F which corresponds to the difference between the load $F_R$ exerted on the shoulder belt and the load $F_{R1}$ exerted on the lap belt. It has been experimentally verified that the load F can be confined to below approximately 50 Kg. Therefore, the restriction in strength of the mounting portion of the retractor is diminished, and the retractor can be mounted at a position whereby it is easily housed in the quarter or in the center pillar. Accordingly, the invention is remarkably effective in that the belt attaching and detaching operations by a rear seat occupant can be sharply enhanced.

In this invention, there is no obstruction in the use of the belt as attributed to the fact that the retractor is mounted on the side wall in the interior of the vehicle.

What we claim is:

1. A vehicle seat belt system for reducing the effective load impressed upon the seat belt fitting which secures the seat belt retractor means to the vehicle, comprising:

belt means integrally defining a shoulder belt and a lap belt;
a first slip joint secured to the upper part of an interior side wall of a center pillar of said vehicle;
a second slip joint secured to a rocker panel disposed within the floor region of said vehicle;
a tongue plate disposed upon said belt means;
said center pillar extending vertically and being provided with a hollow portion access to which is provided by means of a window defined within said interior side wall of said pillar;
a cover disposed over said window for covering said window;
seat belt retractor means comprising two seat belt retractors disposed within said hollow portion of said center pillar, said retractors being arranged vertically in a series so as to define upper and lower seat belt retractors and being mounted upon a common retractor fitting secured to the surface of said cover which faces said hollow portion of said pillar;

a shoulder belt port defined within the upper part of said cover for permitting said shoulder belt to pass therethrough, and a lap belt port defined within the lower part of said cover for permitting said lap belt to pass therethrough;

said shoulder belt having one end thereof wound upon said upper seat belt retractor which has a belt port defined within the upper part thereof;

said lap belt having one end thereof wound upon said lower seat belt retractor which has a belt port defined within the lower part thereof;

said shoulder belt extending upwardly from said upper seat belt retractor and through said upper seat belt retractor belt port and said shoulder belt port defined within said cover so as to pass through said first slip joint and extend toward said tongue plate;

said lap belt extending downwardly from said lower seat belt retractor and through said lower seat belt retractor belt port and said lap port defined within said cover so as to pass through said second slip joint and extend toward said tongue plate; and the other ends of said shoulder and lap belts being passed through said tongue plate, whereby as a result of said mounting of said two seat belt retractors upon said common fitting, and said upward disposition of said shoulder belt from said upper seat belt retractor to said first slip joint as well as said downward disposition of said lap belt from said lower seat belt retractor to said second slip joint, when said vehicle is suddenly decelerated, forces will be transmitted through said shoulder and lap belts to said common fitting, yet the net effective force impressed upon said common fitting will be equal only to the difference in the magnitudes of said forces transmitted through said shoulder and lap belts.

* * * * *